United States Patent [19]
Laush et al.

[11] Patent Number: 4,523,933
[45] Date of Patent: Jun. 18, 1985

[54] APPARATUS FOR CONVEYING PARTICULATE MATERIAL

[75] Inventors: Frank I. Laush, Edmonds; Vernon L. Parker, Everett, both of Wash.

[73] Assignee: Scott Paper Company, Philadelphia, Pa.

[21] Appl. No.: 307,111

[22] Filed: Sep. 30, 1981

Related U.S. Application Data

[63] Continuation of Ser. No. 182,682, Aug. 29, 1980, abandoned.

[51] Int. Cl.³ .............................................. B01D 46/00
[52] U.S. Cl. ........................................ 55/97; 55/431
[58] Field of Search ............... 55/96, 97, 242, 302, 55/428–433; 406/194, 48; 210/512 M, 537; 366/139, 10

[56] References Cited

U.S. PATENT DOCUMENTS 2,304,744 12/1942 Snyder ................................. 55/466
3,720,315 3/1973 Kaiser ................................. 209/211
3,879,179 4/1975 Chinnock et al. ...................... 55/1

*Primary Examiner*—Bernard Nozick
*Attorney, Agent, or Firm*—Joseph H. Yamaoka; John W. Kane, Jr.

[57] ABSTRACT

An apparatus for conveying particulate material that is directed through an outlet passage (50) of a chamber (40). The apparatus includes a slurry-conveying conduit (54) communicating with the outlet passage and further including liquid flow control means (58, 68, 70 and 59) for only partially filling the conduit with a liquid for conveying the particulate material away from the chamber as a slurry while maintaining an air passage (72) in the conduit that communicates with the outlet passage of the chamber; and vacuum creating means (74, 77) communicating with the air passage in the conduit for establishing a partial vacuum in the passage to impede liquid vapors from flowing into the chamber. The method in which the above apparatus is operated also forms a part of the present invention.

4 Claims, 3 Drawing Figures

APPARATUS FOR CONVEYING PARTICULATE MATERIAL

This is a continuation, of application Ser. No. 182,682, filed Aug. 29, 1980 now abandoned.

TECHNICAL FIELD

This invention relates generally to the field of conveying particulate material, and more specifically to an apparatus and method employed to convey particulate material in a liquid medium away from a particle-retaining source. This invention is particularly suited for conveying particulate emissions away from a filter chamber that is associated with boilers, furnaces and the like.

BACKGROUND ART

It is common practice to control particulate emissions from boilers and similar devices by directing particle-laden flue gases through separating devices for removing a large percentage of the particles prior to directing the gases to atmosphere. For this purpose cyclone separators have been employed; however, in many localities the degree of particle removal employing only cyclone separators has not been found satisfactory to meet stringent air pollution requirements.

Scott Paper Company, the assignee of the instant application, employs several boilers that burn wood waste as fuel (i.e. hogged fuel boilers) to provide heat and steam for its manufacturing operations in Everett, Wash. This use of wood waste is desirable for at least two reasons. First, it is a relatively inexpensive source of energy, as compared to petroleum fuel products, and second, it eliminates a potential disposal problem for the wood waste materials. However, it has been difficult to consistently meet stringent local air pollution requirements by merely directing the spent flue gases from the hogged fuel boilers through cyclone separators prior to emitting the gases to atmosphere. To meet these stringent air pollution requirements Scott Paper Company has installed an extremely efficient baghouse system downstream of its existing cyclone separators for removing the necessary particulate contaminates from the gaseous stream prior to directing the gas to atmosphere.

Baghouses are well known devices employed to separate particulate materials from gases. One conventional system (i.e. the one employed by Scott Paper Co.) is manufactured by Standard Havens of Kansas City, Mo., and includes a plurality of filter bags formed of woven fiberglass, coated with Teflon. The baghouse system utilized by Scott in conjunction with five (5) hogged fuel boilers includes seventeen modules; each housing 210 bags. The flue gases from the boilers, after being directed through cyclone separators, are directed into the baghouse and through the filter bags prior to being emitted through the stack to atmosphere. Fine particulate materials that are not removed in the cyclones are trapped on the outer surfaces of the filter bags. At periodic intervals different modules can be taken off-line and either shaken or pulsed with air to free the particulate material from the filter bags and cause the freed material to fall by gravity out the bottom of the modules.

Several different systems have been employed to convey fly ash and similar particulate materials away from baghouse modules, cyclone separators and similar particle separating devices.

For example, screw conveyors and chain conveyors have been employed in connection with rotary valves at the lower end of hoppers associated with baghouse modules to convey particulate material away from the baghouse. However, when the baghouse is operated in a corrosive, high temperature environment, such as is encountered at a paper mill, bearings associated with the screw and chain conveyors tend to wear excessively; requiring undesirable downtime and expensive bearing replacements. In addition, the rotary valves which control the feed of particles to the conveyor tend to plug up and malfunction; thereby causing the discharge opening from the modules to plug up. This can cause the modules to fill up with hot fly ash and other particulate material which burn the filter bags thereby creating a costly bag replacement problem. Furthermore, the rotary valves which tend to wear out or seize-up in corrosive high temperature environments of the type encountered at a paper mill, are expensive to replace.

A different type of conveying system utilizes compressed air as the conveying medium. In this system a rotary valve is utilized to feed the particulate material into the stream of compressed air, and to isolate the compressed air from the particle-separating device so that it will not interfere with the particle-separating operation. The use of rotary valves in this system introduces the same problems described above in connection with the chain and screw conveying systems. In addition, the compressed air added to the system to accomplish the removal operation requires the use of more complex air handling and separating equipment than would be the case if air were not added to the system.

Slurry systems also have been employed to convey particulate materials; particularly in connection with cyclone separators operated under positive pressure. The gases containing particulate materials are received in the separators under positive pressure, and the heavier particles are centrifuged to the outer walls and dropped to the bottom by gravity. These heavier particles are dumped into an exit conduit filled with flowing water to convey the particles to further storage and/or separation systems. Although this type of slurry system had been found to work well in the conveying of heavy particles separated in cyclone separators operated under positive pressure; it is extremely difficult to employ such a slurry system in a high temperature environment for conveying away lighter particulate material from a baghouse or similar installation operated under negative-or atmospheric pressure conditions. In these latter systems the water in the conveying duct tends to vaporize, and the vapors tend to enter the modules associated with the baghouse to wet and clog the filters; thereby impairing the particle separating operation of the unit. This problem is particularly acute when the modules are operated under negative pressure conditions.

If a slurry conveying system could be designed for use with baghouses and other particle-separating or storage devices maintained either under atmospheric or negative pressure conditions without the attended vaporization problems, and without the need for incorporating rotary or similar valve structures into the devices, the slurry system would clearly be more preferred than their mechanical counterparts. Specifically, such a slurry system would not be riddled with the problems of worn bearings and corroded parts that are encountered in the prior art mechanical systems employing screw or chain conveyors and rotary valve systems. It is to this latter type of slurry system that the instant invention is directed.

DISCLOSURE OF INVENTION

A conveying system for particulate material directed through an outlet passage of a chamber employs a slurry-conveying conduit communicating with said outlet passage; said conveying system being characterized by liquid flow control means for partially filling the conduit with a liquid to convey the particulate material away from the chamber as a slurry while maintaining an air passage, or bridge, in the conduit that communicates with the outlet passage of the chamber; and vacuum creating means for establishing a partial vacuum in said air passage above the liquid in the conduit for impeding liquid vapor flow into the chamber.

The instant invention is extremely well suited for use in connection with a particle-collecting chamber of the type employing a plurality of filter bags through which gas entraining the particulate material is directed to deposit the particulate material on the outer surface of said bags. The conveying system can be employed in connection with a single module housing one or more filter bags; or more preferably with a plurality of modules; each of which houses a plurality of filter bags and each of which has an outlet passage communicating with the slurry-conveying conduit.

In the most preferred embodiment of this invention the conduit is inclined at an angle to the horizontal for establishing a predetermined direction of liquid flow. More preferably a flushing section, or chamber, is disposed between the outlet passage of the particle-collecting chamber (in which the filter bags are retained) and the slurry-conveying conduit. As the particulate material is directed through the flushing section it is wetted with water to form a slurry, and this slurry flows downwardly into the slurry-conveying conduit.

The conveying system of this invention is employed most advantageously with one or more particle-collecting modules that are operated under negative pressure conditions to direct flue gases entraining particulate emissions through filter bags retained within the modules to thereby deposit the particles on the bags and direct clean gases to the atmosphere. It is in this environment that the partial vacuum in the slurry-conveying conduit is most needed to impede the transmission of water vapor into the collecting modules.

Other objects and advantages of this invention will become apparent by referring to the detailed description which follows, taken in conjunction with the following drawings.

BEST MODE FOR CARRYING OUT THE INVENTION

Figure 1:
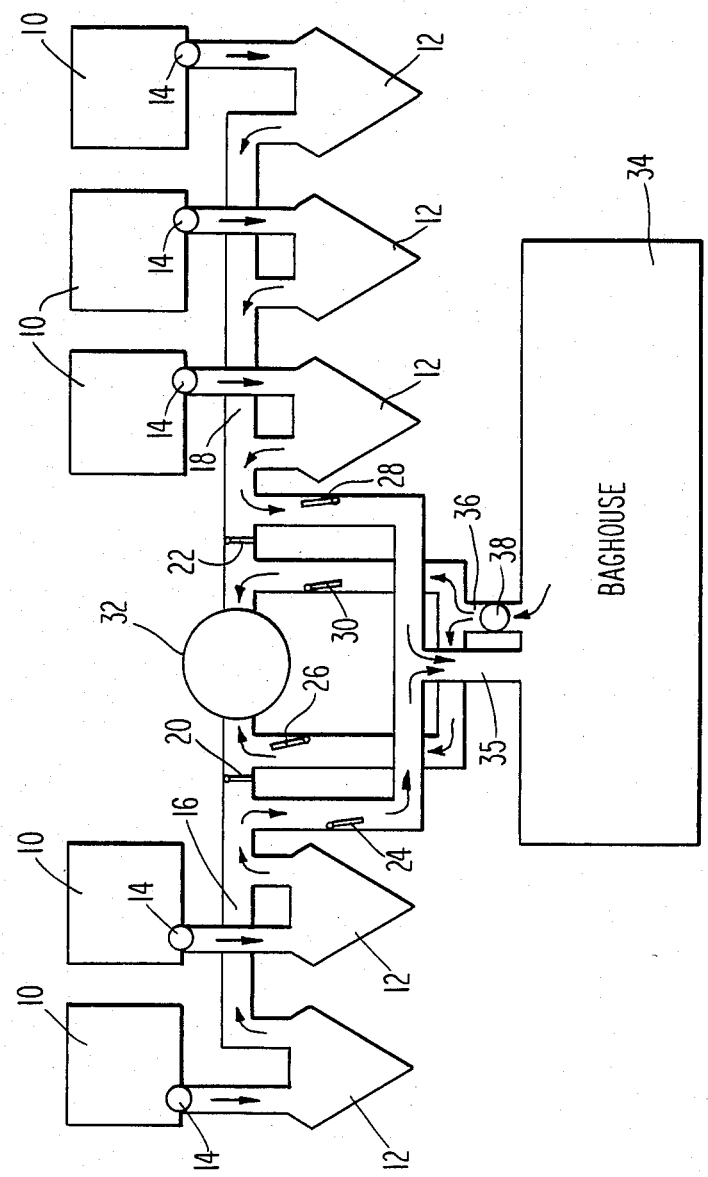
FIG. 1 is a schematic view illustrating a preferred environment in which the present invention is employed.

The present invention is directed to a conveying system for particulate material separated from a carrier gas in a baghouse. Referring to FIG. 1, a preferred environment employing this invention includes a plurality of wood waste burning boilers 10 which can be employed to generate heat and steam for use in manufacturing operations. Burning of this wood waste creates particulate emissions (e.g. fly ash) which need to be removed from the carrying gas stream prior to emitting the gaseous emissions to atmosphere. In this regard, each of the boilers 10 feeds a cyclone separator 12 through an associate induced draft fan 14. The heavy particulate material in the gases are caused to separate from the air stream by centrifugal force, and are removed from the bottom of the separators and directed to a storage facility (not shown). The gases separated from this particulate material are directed through conduits 16 and 18, and depending upon the position of dampers 20, 22, 24, 26, 28 and 30, these gases either will be directed through an outlet stack 32 to atmosphere, or through a baghouse 34 employed in this invention. The baghouse is included in the air handling circuit by closing dampers 20 and 22, and opening the remaining four dampers, as illustrated. In this mode of operation, the hot gases, freed from large particulate material in the cyclone separators 12, are directed into the baghouse through an inlet 35. After fine particulate material is separated from this gas stream in the baghouse, clean gases exit through an outlet 36. The gas flow through the baghouse is controlled by a booster fan 38 connected in the circuit to the clean gas side of the baghouse. In the preferred embodiment of this invention a 900 horsepower booster fan is run at 900 rpm to induce a gas velocity of 4,000 feet per minute.

As will be explained in greater detail hereinafter, the baghouse 34 includes a plurality of modules; each of which includes a plurality of filter bags in them. In the preferred embodiment of this invention the baghouse 34 includes 17 modules, and each of these modules includes 210 filter bags of woven fiberglass coated with Teflon, as described earlier in this application. The inlet 35 of the baghouse communicates through a plenum chamber, or duct with an inlet to each of the various modules, and the outlet 36 of the baghouse likewise communicates through a plenum chamber, or duct with outlets from each of the modules. This arrangement of duct work will be described in greater detail later in this application. The baghouse 34 described thus far is conventional, and can be purchased from Standard Havens of Kansas City, Mo.

Figure 2:
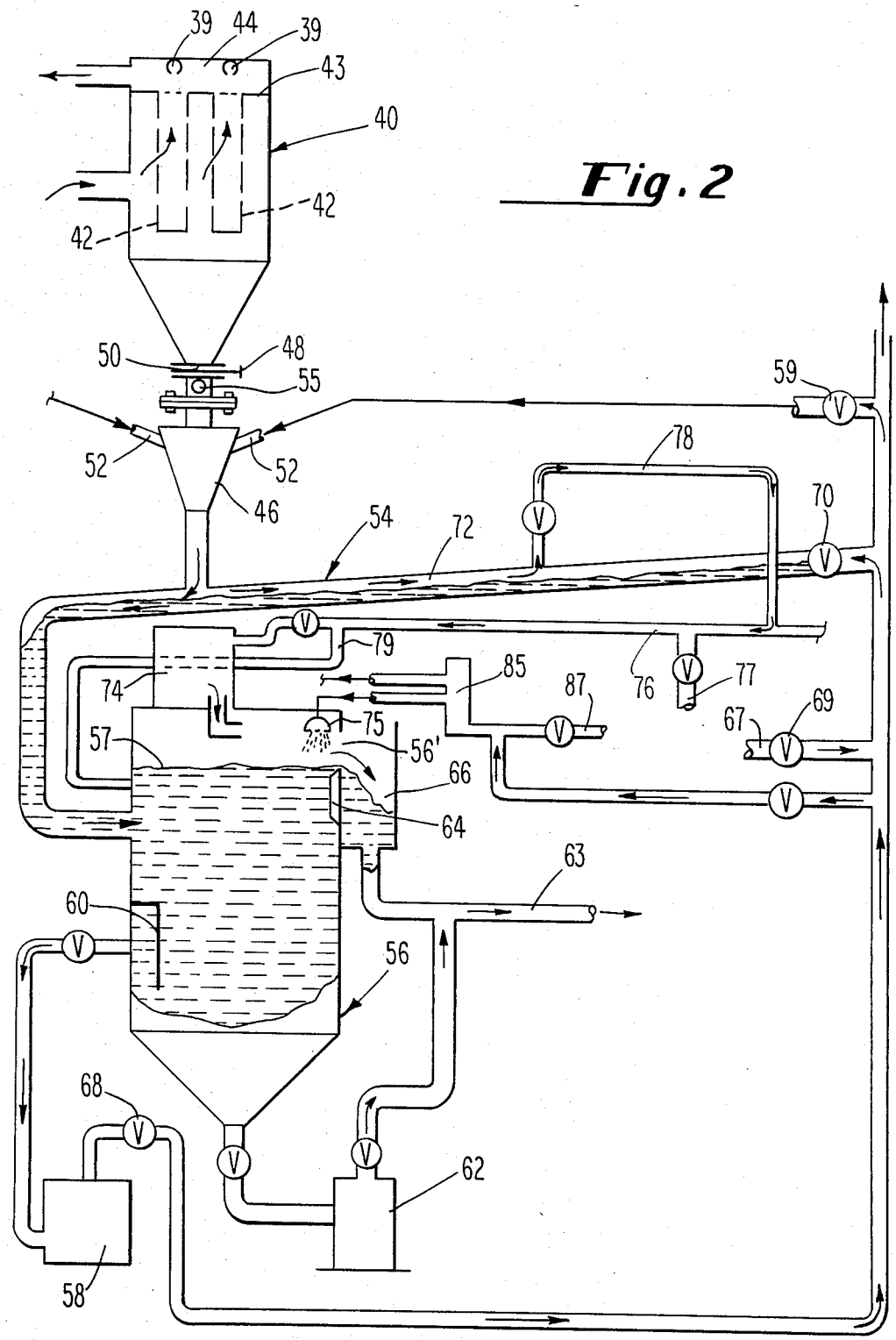
FIG. 2 is a schematic side elevation view illustrating the unique conveying system of this invention.

Referring to FIG. 2, one of the baghouse modules 40 is shown in association with the conveying system of this invention for directing particulate waste away from the baghouse. The module 40 includes a plurality of filter bags; only two of which are illustrated at 42. These bags are formed of woven fiberglass, coated with Teflon, and are supported internally by stainless steel mesh supports. Each filter bag has an open upper end communicating through a pervious region of an otherwise impervious support surface 43 with an internal plenum chamber 44. Due to the manner in which the filter bags 42 are mounted in the module 40, the vacuum established in the outlet 36 by the booster fan 38 will direct the air entraining the particulate material through the filter bags prior to directing the air into the plenum chamber 44. As the gases pass through the filter bags they deposit their particulate contaminants on the outer surface thereof. After a suitable period of time, the module can be disconnected from the circuit by suitable valves to be described hereinafter, and the filter bags cleaned by pulsing them with a reverse blast of air to remove the particulate contaminants. The reverse blast of air is directed through conduits 39 having openings aligned with the filter bags, and being connected through a plenum chamber to a suitable compressor (not shown). For example, a 75 H.P. compressor supplying air at 115 P.S.I. has been employed with success to accomplish the pulsing operation. The particular means for cleaning the bags does not constitute a limitation on the present invention.

In the preferred embodiment of this invention the loose particulate materials removed from the filter bags 42 will be directed into a conical shaped flushing bowl 46 which is connected through a knife valve 48 to module outlet 50. The knife valve will be opened during the pulsing or vibrating operation to permit particle flow into the flushing bowl. The only time the knife valve 48 is closed is for repairing, or otherwise servicing the module. Water is directed into the flushing bowl tangentially through a pair of valved conduits 52 located 180 degrees from each other. This assures even distribution of water within the bowl to uniformly wet the particles, and to form a liquid slurry which flows by gravity into a slurry-conveying conduit 54 for ultimate disposal by the unique system which will hereinafter be described. The water for use in the flushing bowl is obtained from a slurry tank 56, and is directed into the conduits 52 by a suitable pump 58, through valves 59 (only one being shown in FIG. 2).

An inspection port 55 provided with a swing cap is located adjacent the outlet of the module 40 below the knife valve 48. In the event the flushing bowl 46 becomes clogged to cause water to build up in it, the swing cap will be forced open to permit the water to escape rather than entering the module and damaging the filter bags.

The slurry conveyed through conduit 54 is directed into the upper end of the slurry tank 56, but below the upper surface 57 of the liquid therein to insure that all of the particulate matter will be wetted. A baffle 60 located in the tank directs the heavy particles to the bottom, where they are removed by a pump 62 and directed through a conduit 63 to a storage tank or area (not shown). The very light particulate material will float on the top of the liquid in the slurry tank 56, and flow over weir 64 into a basin 66, and then through the same discharge conduit 63 that receives the heavy particulate material. The liquid removed from the system through the discharge conduit 63 is replenished by the addition of liquid through a make-up line 67 from the water supply of the city or municipality. This is accomplished by the opening of valve 69 in response to the detection of an undesirably low liquid level in slurry tank 56.

The pump 58, along with valves 68, 70 and 59 constitute flow control means for directing water from the slurry tank 56 into the slurry-conveying conduit 54. The flow of water is controlled so that it incompletely fills the slurry-conveying conduit at least in the slightly inclined section (i.e. on the order of 5-10 degrees from the horizontal) that directly communicates with the outlet from the flushing bowl 46. The primary source of water for conduit 54 is from the conduits 52 feeding the flushing bowls of the various modules. A valve is associated with each conduit 52 (only one being shown at 59 in FIG. 2) to aid in controlling the liquid flow. As needed, the valve 70 will be opened to add additional water to the conduit 54 to maintain the desired liquid level; the liquid level being viewable through site-ports (not shown) in said conduit. Most preferably the liquid level is maintained at a height less than ½ the diameter of the conduit to form an air bridge, or passage 72; the purpose of which will be described hereinafter. Note that the slurry-conveying conduit 54 communicates with the outlet 50 of the module 40 through the knife valve 48 and the flushing bowl 46.

In accordance with an extremely important feature of this invention, water vapor is impeded from entering the module 40 by a partial vacuum established within the air passage 72 of the slurry-conveying conduit 54. This partial vacuum is established by any suitable source of vacuum, such as a blower 74 that communicates through suitable connecting pipework 76, 78 with the air passage 72. The vacuum level in passage 72 is controlled through a valved vent 77, and once the desired level is set there generally is no need for further adjustments. A drain conduit 79 is provided to receive any liquid that may be pulled through the pipe 76 and to direct said liquid into the slurry tank 56.

The partial vacuum established in the passage 72 functions to prevent, or impede water vapor from being directed into the module 40; particularly in the preferred form of this invention in which the module 40 is maintained under continuous negative pressure by the booster fan 38. In this latter environment that partial vacuum established by the fan 74 is controlled through the valved vent 77 to be slightly higher (on the order of 1 inch of water higher) than the vacuum level in the module 40. This functions to counteract the effect of the partial vacuum within the module to thereby prevent water vapors from being directed up into the module, wetting the filter bags and thereby interfering with the particle removing operation in the baghouse 34. In a preferred method of operation the vacuum level in the module 40 is at about 7 inches of water and vacuum level in air passage 72 is set at about 8 inches of water.

The air pulled through the blower 74 is scrubbed by a bank of water showers (one being indicated schematically at 75) positioned about the interior circumference adjacent outlet 56' of the tank 56. This will wash out particulate materials entrapped in the air prior to the air exiting the slurry tank 56 to atmosphere. Water is fed to the showers 75 by pump 58 through a shower header 85. The water lost from the system through the showers 75 can be replaced from the public water supply through a valved conduit 87.

Figure 3:
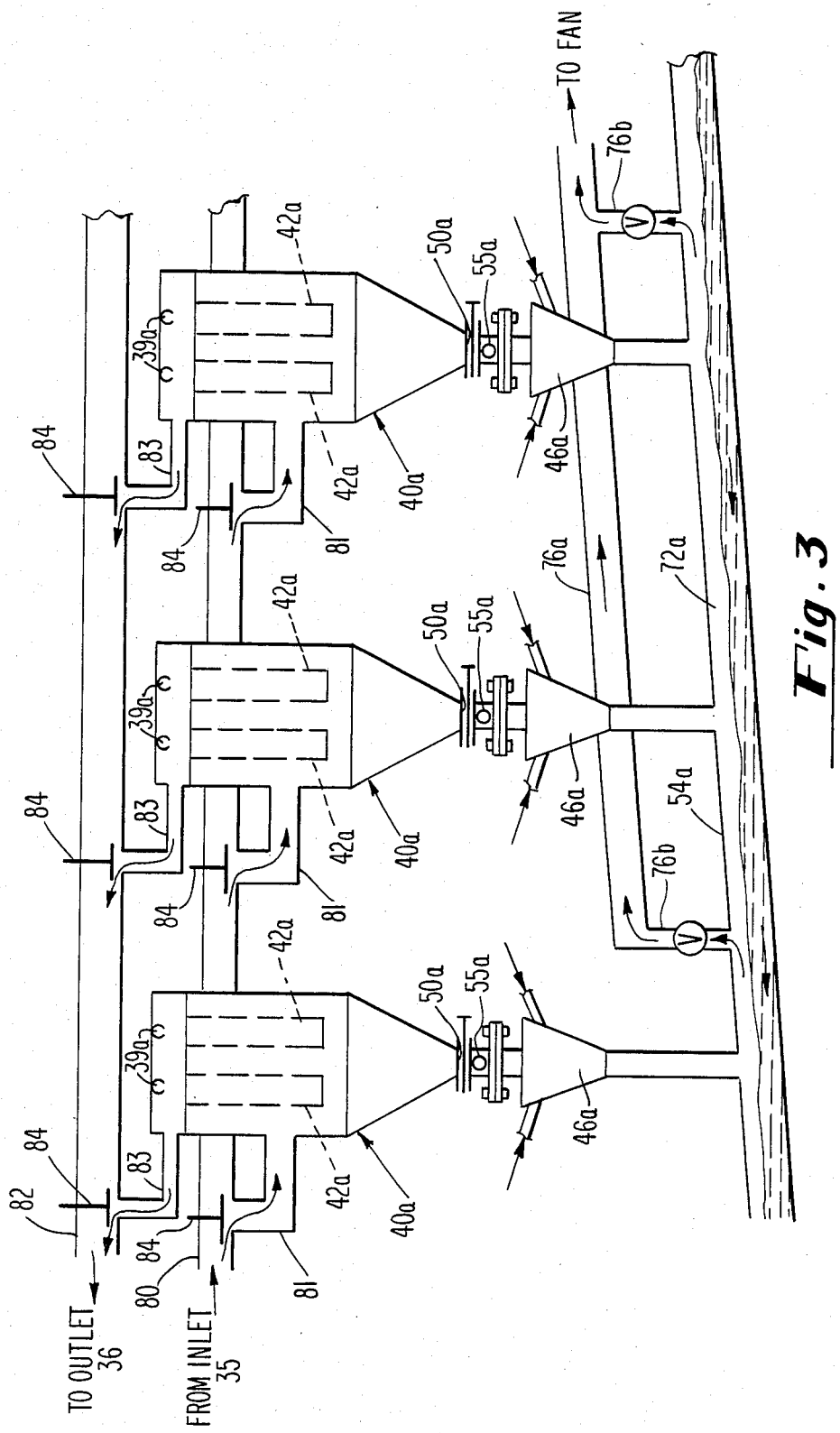
FIG. 3 is a schematic side elevation view illustrating the conveying system of this invention in connection with a plurality of filter-containing modules.

Referring to FIG. 3, elements similar, or identical to those described earlier will be referred to by the same reference numeral with a suffix "a". Three modules 40a are illustrated, somewhat schematically, as being interconnected in the manner in which all 17 modules in the baghouse are interconnected. Specifically, a common inlet duct, or plenum 80 communicates directly with the inlet 35 to the baghouse, and also communicates with individual inlet pipes 81 associated with each of the modules 40a. In a like manner, a common outlet duct, or plenum 82 communicates with the outlet 36 from the baghouse, and also communicates with individual outlet pipes 83 associated with the individual modules 40a. This arrangement permits the flue gases entering the inlet 35 of the baghouse 34 to be directed through any of the modules 40a.

As is schematically indicated in FIG. 3, a plurality of poppet valves 84 are provided to selectively close off communication between any particular module inlet pipe 81 or outlet pipe 83 and its associated common duct 80 or 82. This arrangement permits any individual module 40a to be removed from the filter circuit for cleaning or to regulate the pressure drop through the baghouse, as desired. When a module is to be cleaned the poppet valve associated with the inlet pipe 81 of that module will be closed off to prevent flue gases from entering it. In addition the poppet valve associated with the outlet pipe 83 of that module will be closed approximately 90% to provide a small bleed-passage for the escape of gas employed to pulse the filter bags 42a. Thereafter a blast of air will be directed through each bag 42a from conduits 39a having openings aligned with the bags and being connected through a plenum chamber (not shown) to a compressor of the type described in connection with FIG. 2. This plenum chamber communicates with each individual conduit 39a through a valve that is selectively opened to establish communication between the compressor and the conduit(s) aligned with the bags to be cleaned. It is again emphasized that the particular manner of cleaning the filter bags 42a does not form a part of the instant invention but is disclosed solely for the purpose of completeness.

Most preferably the baghouse operation is controlled by a Modicon programmable controller. This controller is employed to regulate the cleaning cycle by selectively closing the required poppet valves 84 to take the desired module(s) 40a out of service for cleaning. In addition, the controller will selectively open the required valves to communicate the appropriate conduits 39a with the compressed air employed to pulse the bags. The cleaning cycle can be activated by either a timing cycle or a differential pressure signal indicating that a filter should be cleaned. If desired, the control system can be set up to operate either automatically as described above, or to be manually overridden by the operator.

The particular system used to control the baghouse operation does not form a part of the present invention, but has been briefly described above for purposes of completeness.

Referring again to FIG. 3 note that the individual outlets 50a of each of the modules 40a communicate with an inclined segment of slurry-conveying conduit 54a through associated flushing bowls 46a in the same manner as described earlier in connection with FIG. 2. Also, as described earlier, the inclined section of the conveying duct 54a is maintained only partially full of water, and preferably less than ½ full to provide an air passage or bridge 72a. A suitable connecting conduit 76a communicates with slurry-conveying conduit 54a at desired intervals through branch pipes 76b. This conduit 76b also communicates with a vacuum creating source such as a fan (not shown) to establish a desired vacuum level in the air bridge 72a to prevent water vapors from being sucked into the individual modules by the negative pressure conditions existing in these modules during the filtering operation.

We claim the following as our invention:

1. A system for removing particulate material from a gas stream comprising a chamber having an inlet for receiving the gas stream containing said particulate material and an outlet passage through which the particulate material is adapted to be removed, filter means within the chamber for intercepting the gas stream and collecting the particulate material thereon, vacuum creating means for establishing a pressure drop across the chamber for causing gas flow through the filter means and means for removing the retained particulate material from the filter means and causing it to flow, by gravity, out of the outlet passage of the chamber; characterized in that the system includes a slurry-conveying conduit communicating with the outlet passage; liquid flow control means for only partially filling the conduit with a liquid for conveying the particulate material away from the chamber as a slurry while maintaining an air passage in the conduit that communicates with the outlet passage of the chamber; and vacuum creating means communicating with the air passage in the conduit for establishing a higher vacuum in said air passage than in the chamber whereby liquid vapors are impeded from flowing into the chamber from the slurry-conveying conduit.

2. The conveying system of claim 1 characterized in that a section of the slurry-conveying conduit in communication with the outlet passage of the chamber is inclined at an angle to the horizontal for establishing a predetermined direction of liquid flow through said conduit.

3. The conveying system of claim 1 characterized in that a flushing section is disposed between the outlet passage of the chamber and the slurry-conveying conduit for receiving the flow of particulate material therethrough and means for wetting the particulate material as it is directed through said flushing chamber to aid in forming the slurry in the slurry-conveying conduit.

4. An emission control system for removing particulate material generated in wood waste burning boilers, said system including a baghouse employing vacuum creating means for causing particulate material entrained in a gas to be drawn into the baghouse and filter bags for intercepting the flow of the particulate material entrained within the gas and for retaining the particulate material thereon while permitting the gas to pass therethrough; means for removing the retained particulate material from the filter bags and causing them to flow, by gravity, out of said baghouse through outlet means; characterized in that a liquid conveying system for the particulate material includes a slurry-conveying conduit communicating through a particle-wetting chamber with the outlet means, said conduit being inclined at an angle to the horizontal for establishing a predetermined direction of liquid flow; means for introducing water into the particle-wetting chamber to form a slurry that flows by gravity into the slurry-conveying conduit without completely filling the conduit to thereby provide an air passage in the conduit that communicates with the outlet means from the baghouse; and means for establishing a vacuum in said air passage that is higher than the vacuum in the baghouse whereby liquid vapors are impeded from flowing from the slurry-conveying conduit into the baghouse.

* * * * *